United States Patent [19]
Kaneda et al.

[11] Patent Number: 5,629,735
[45] Date of Patent: May 13, 1997

[54] IMAGE SENSING DEVICE HAVING A SELECTABLE DETECTING AREA

[75] Inventors: Kitahiro Kaneda; Akihiro Fujiwara, both of Kanagawa-ken; Kunihiko Yamada, Tokyo; Hirofumi Suda, Kanagawa-ken; Masamichi Toyama, Kanagawa-ken; Hideyuki Arai, Kanagawa-ken, all of Japan

[73] Assignee: Canon Kabushiki Kaisha, Tokyo, Japan

[21] Appl. No.: 458,227

[22] Filed: Jun. 2, 1995

Related U.S. Application Data

[63] Continuation of Ser. No. 158,145, Nov. 19, 1993, abandoned, which is a continuation of Ser. No. 888,458, May 20, 1992, abandoned, which is a continuation of Ser. No. 565,278, Aug. 9, 1990, abandoned.

[30] Foreign Application Priority Data

| Aug. 20, 1989 | [JP] | Japan | 1-213837 |
| Jan. 9, 1990 | [JP] | Japan | 2-002971 |

[51] Int. Cl.$^6$ .................................................. H04N 5/232
[52] U.S. Cl. .................................... 348/350; 348/345
[58] Field of Search .................................. 348/207, 345, 348/346, 347, 349, 350, 354, 358; 354/400; H04N 5/232

[56] References Cited

U.S. PATENT DOCUMENTS

| 4,647,979 | 3/1987 | Urata | 358/227 |
| 4,853,789 | 8/1989 | Murashima et al. | 358/227 |
| 4,872,058 | 10/1989 | Baba et al. | 358/227 |
| 4,967,280 | 10/1990 | Takuma et al. | 358/227 |
| 5,031,049 | 7/1991 | Toyama et al. | 348/347 |
| 5,128,768 | 7/1992 | Suda et al. | 358/227 |

FOREIGN PATENT DOCUMENTS

| 116178 | 1/1989 | Japan | H04N 5/232 |

*Primary Examiner*—John K. Peng
*Assistant Examiner*—Tuan V. Ho
*Attorney, Agent, or Firm*—Robin, Blecker, Daley & Driscoll

[57] ABSTRACT

An automatic focusing device which is capable of movably setting within an image sensing plane a focus detecting area for detecting the focused degree of an object image formed on the image sensing plane by a photo-taking optical system comprises a position detecting circuit for detecting the position of an object within the focus detecting area, a computing circuit for computing on the basis of information from the position detecting circuit a setting position for setting the focus detecting area, and a control circuit which is arranged to move the focus detecting area according to the output of the computing circuit and to vary and control at least one of the size, the moving range and the moving response speed of the focus detecting area according to information on the depth of field of the photo-taking optical system.

53 Claims, 9 Drawing Sheets

| FOCUS DETECTING AREA SETTING PARAMETER<br>DEPTH OF FIELD | | SIZE | MOVING RANGE | RESPONSE SPEED |
|---|---|---|---|---|
| SHALLOW | DP1 | W1 | X1 | SP1 |
| ↑ | DP2 | W2 | X2 | SP2 |
| | DP3 | W3 | X3 | SP3 |
| ⋮ | ⋮ | SMALL ↕ LARGE | LARGE ↕ SMALL | HIGH ↕ LOW |
| DEEP | DP2n | W2n | X2n | SP2n |

100: PEAK POSITION
101: FOCUS DETECTING AREA (PHi, PVi): PEAK POSITION COORDINATES (AFTER COMPUTATION)
(Xi, Yi)  : OBJECT CENTROID POSITION COORDINATES

101: FOCUS DETECTING AREA (SIZES W1 ····· W2n)
102: MOVING RANGE OF FOCUS DETECTING AREA (X1 ····· X2n)

IMAGE SENSING DEVICE HAVING A SELECTABLE DETECTING AREA

This is a continuation application under 37 CFR 1.62 of prior application Ser. No. 08/158,145, filed Nov. 19, 1993, abandoned, which is a continuation of Ser. No. 07/888,458, filed May 20, 1992, abandoned, which is a continuation of Ser. No. 07/565,278, filed Aug. 9, 1990, abandoned.

BACKGROUND OF THE INVENTION

1. Field of the Invention

This invention relates to an image sensing device which is advantageously adapted for a video camera, electronic still camera or the like.

2. Description of the Related Art

In the following description, an automatic focusing device is taken up by way of example as the image sensing device. The automatic focusing devices of cameras have been arranged to operate in varied manners. In the case of an apparatus of the kind having image sensing means for obtaining a video signal by photo-electrically converting the image of a picture-taking object, such as a video camera or an electronic still camera, the automatic focusing device is arranged to detect the definition of the object image through the video signal and to make focus adjustment to maximize the degree of definition of the image.

Generally, the apparatus of the above-stated kind is arranged to set a focus detecting area in a part of an image sensing plane. A focus detecting action is performed on an image formed within this area. During recent years, apparatuses of the kind having an automatic object tracing function have been proposed. The apparatus is arranged to be capable of automatically shifting the focus detecting area while tracing the movement of an object for increased performance and functions of the apparatus. This apparatus has been disclosed, for example, in Japanese Laid-Open Patent Application No. SHO 60-249477.

Various methods also have been proposed for tracing the movement of the object. In one of them, for example, the moving position of the object is detected by detecting, as a featuring point of the object image, the peak value of a high-frequency component of the video signal or the like obtained from within the focus detecting area for every field or frame; and, after that, the focus detecting area is newly set in a position where the moving position of the object is located approximately in the center of the area. This method enables a focusing action to be continuously performed on a moving object.

In the apparatus of the above-stated kind, the focus detecting area is arranged to be unvarying in size and to move at an unvarying speed in tracing the object for every field irrespective of picture taking (shooting) conditions. Assuming that the object tracing action is performed by detecting the peak value of the high-frequency component as a feature point of the object, it is difficult to distinguish a main object from a background object in the event of a deep depth of field. A faulty action tends to be caused, under such a condition, by a perspective confusion or an ambiguous relation between the focus detecting area and the object.

Further, in the case of the apparatus of the above-stated kind, the focus detecting area continuously moves in pursuit of the object irrespectively of the shooting conditions. Therefore, in cases where the main object goes out of the image sensing plane because of the movement of the object or the camera itself and where an excessively blurred state is caused by a faulty action of the automatic focusing device, the object having the feature point no longer exists within the focus detecting area. In such a case, the movement of the focus detecting area might be too unstable for continuously performing an accurate focusing action on the object.

Previous patents and patent applications related to the above-stated object tracing devices of the prior art include: U.S. Pat. No. 4,872,058 and U.S. patent application Ser. No. 737,163 filed on May 23, 1985; Ser. No. 154,078 filed on Feb. 9, 1988; Ser. No. 237,511 filed on Aug. 26, 1988; and Ser. No. 240,915 filed on Sep. 6, 1988.

SUMMARY OF THE INVENTION

This invention is directed to the solution of the above-stated problem of the prior art.

It is a first object of the invention to provide a device for performing optimum control, according to shooting conditions, over an object detecting area which is movably set on an image sensing plane.

It is a second object of the invention to provide a device for controlling and adjusting to an apposite size, according to the operating state of a photo-taking optical system, the size of a detecting area which is set on an image sensing plane.

It is a third object of the invention to provide a device for controlling and appositely adjusting, according to the operating state of a photo-taking optical system, the movable range of a detecting area which is movably set on an image sensing plane.

It is a fourth object of the invention to provide a device for appositely controlling, according to the operating state of a photo-taking optical system, the moving response speed of a detecting area which is movably set on an image sensing plane.

To attain this object, an image sensing device arranged as a preferred embodiment of this invention to movably set within an image sensing plane a detecting area from which predetermined information is to be detected comprises: detecting means for detecting the above-stated information obtained within the detecting area; computing means for computing a setting position for setting the detecting area on the basis of the information detected by the detecting means; and control means which is arranged to shift the detecting area on the basis of the output of the computing means and to control and vary at least one of the size, the moving range and the moving response speed of the detecting area on the basis of information on picture-taking conditions.

It is a fifth object of the invention to provide an automatic focusing device which is of the kind continuously performing a focusing action by shifting a focus detecting area to trace a moving object and is arranged to appositely control the object tracing movement of the focus detecting area according to shooting conditions.

It is a sixth object of the invention to provide an automatic focusing device which is capable of always appositely controlling and causing a focus detecting area to accurately trace a picture-taking object without the fear of having the operating characteristics such as the size, the moving range and the response speed of the focus detecting area affected by such factors that change according to picture-taking conditions such as the depth of field.

It is a seventh object of the invention to provide an automatic focusing device of the kind continuously performing a focusing action on an object by shifting a focus detecting area to trace the movement of the object, wherein:

at least one of the size, the moving range and the moving response speed of the focus detecting area is controlled according to the depth of field of a photo-taking optical system. An object tracing action, therefore, can be accomplished appositely to the depth of field. This enables the device to always stably keep the object image within the focus detecting area even in cases where the conditions of the object are changed by a change of the depth of field resulting from an aperture adjusting action or a zooming action. Therefore, focus adjustment can be accurately accomplished.

To attain this object, an automatic focusing device which is arranged as a preferred embodiment of this invention to be capable of movably setting a focus detecting area on an image sensing plane for detecting the focused degree of the image of a picture-taking object formed on the image sensing plane by a photo-taking optical system comprises: position detecting means for detecting the position of the object within the focus detecting area; computing means for computing a focus detecting area setting position on the basis of the output of the position detecting means; and control means which is arranged to shift the focus detecting area on the basis of the output of the computing means and to control and vary at least one of the size, the moving range and the moving response speed of the focus detecting area on the basis of information on the depth of field of the above-stated photo-taking optical system.

It is an eighth object of the invention to provide an automatic focusing device which, in addition to the above-stated arrangement of the seventh object of the invention, is provided with display means for displaying the position of the object within the image sensing plane in relation to the focus detecting area.

It is a ninth object of the invention to provide an image sensing device which is capable of controlling and causing a detecting area to accurately, stably and naturally trace a picture-taking object on an image sensing plane without showing any unnatural movement even in cases where there is no object image on the image sensing plane or where the object is hardly distinguishable.

To attain the object, an image sensing device which is arranged as a preferred embodiment of this invention to be capable of movably setting, on an image sensing plane, a detecting area for detecting certain information from the image of an object formed on the image sensing plane by a photo-taking optical system comprises: detecting means for detecting the above-stated information obtained within the detecting area; computing means for computing, on the basis of the information detected by the detecting means, a setting position in which the detecting area is to be newly set; area setting means for setting the detecting area on the basis of the result of the computing operation of the computing means; and means for setting the detecting area in a predetermined position by suspending renewal of the detecting area setting position when the detecting area setting position computing operation of the computing means is impossible.

It is a tenth object of the invention to provide an automatic focusing device which is capable of accurately tracing a picture-taking object by always naturally and stably controlling the movement of the focus detecting area of an image sensing plane to prevent the focus detecting area from moving in any unnatural manner even in cases where there is no object within the image sensing plane or where the object is hardly distinguishable.

To attain the above-stated object, an automatic focusing device which is arranged as a preferred embodiment of this invention to be capable of shifting on an image sensing plane a focus detecting area which is set for detecting the focused state of the image of a picture-taking object formed on the image sensing plane by a photo-taking optical system comprises: position detecting means for detecting the position of the object within the focus detecting area; computing means for computing, on the basis of the output of the position detecting means, a setting position in which the focus detecting area is to be newly set; area setting means for setting the focus detecting area on the basis of the result of the computing operation of the computing means; and means for setting the focus detecting area in a predetermined position by suspending renewal of the setting position of the focus detecting area when the computing operation of the computing means for the setting position of the focus detecting area becomes impossible.

It is an eleventh object of the invention to provide an automatic focusing device which is provided with means for detecting the presence or absence of a picture-taking object within a focus detecting area and is arranged to change a focus-detecting-area controlling algorithm from one algorithm over to another according to whether a picture-taking object can be traced or not, so that an object-tracing picture-taking operation can be accurately and naturally accomplished to give a high picture quality even in cases where the object cannot be traced.

These and further objects and features of the invention will become apparent from the following detailed description of embodiments thereof taken in connection with the accompanying drawings.

DETAILED DESCRIPTION OF THE PREFERRED EMBODIMENTS

Figure 1:
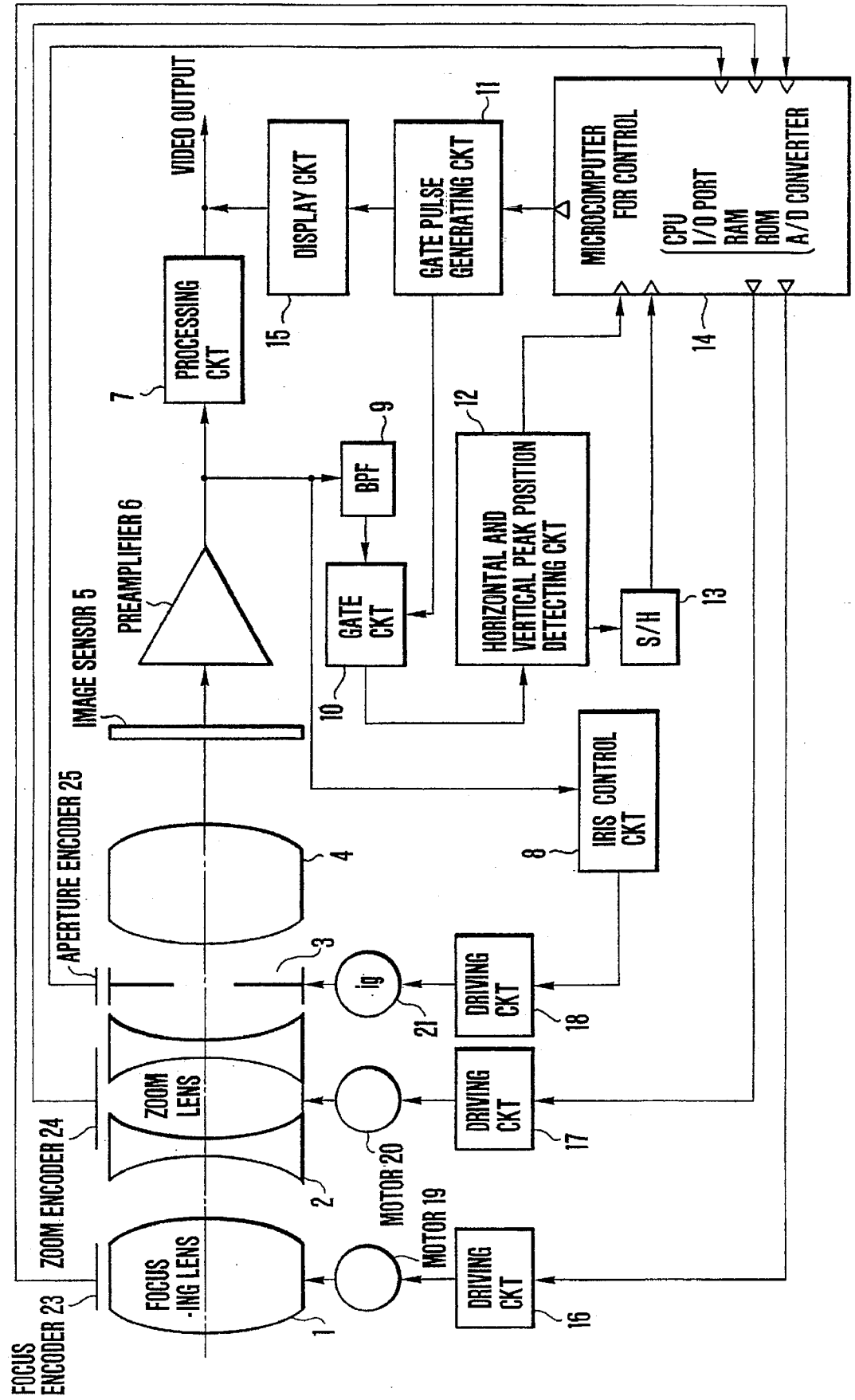
FIG. 1 is a block diagram showing an automatic focusing device arranged according to this invention as an embodiment thereof.

The details of the invented automatic focusing device are as described below through an embodiment of the invention with reference to the accompanying drawings:

FIG. 1 shows an automatic focusing device which is arranged according to this invention. In this case, the device is applied to a video camera or the like. Referring to FIG. 1, a focusing lens 1 is provided for focus adjustment. A zoom lens 2 is provided for zooming. Focusing and zooming actions are performed by causing the lenses 1 and 2 to be moved in the direction of an optical axis by means of motors 19 and 20 through motor driving circuits 16 and 17. An iris 3 is arranged to adjust the quantity of incident light and to be driven and controlled through an IG meter 21 and a driving circuit 18.

A lens 4 is arranged to form an image. An image sensor 5 which is a CCD or the like is arranged to photo-electrically convert the image of a picture-taking object formed on the image sensing plane thereof and to produce a video signal. A preamplifier 6 is arranged to amplify up to a given level the video signal output from the image sensor 5. A processing circuit 7 is arranged to perform a processing action on the video signal output from the preamplifier 6 to convert it into a standard TV signal through a gamma correction process, a blanking process, synchronizing signal adding process, etc., and to output the standard TV signal from a video output terminal. The TV signal thus output from the processing circuit 7 is supplied either to a video recorder which is not shown or some monitor such as an electronic viewfinder or the like. An iris control circuit 8 is arranged to receive the video signal from the preamplifier 6 and to automatically control the driving circuit 18 and the IG meter 21 in such a way as to keep the level of the video signal at a given level.

A band-pass filter (BPF) 9 is arranged to receive the video signal from the preamplifier 6 and to extract from the video signal a high-frequency component which is necessary for focus detection. A gate circuit 10 is arranged to gate the output of the BPF 9 and to pass only a video signal part that corresponds to an area designated within the image sensing plane. A gate pulse generating circuit 11 is arranged to generate, in accordance with an instruction from a control microcomputer, gate pulses for setting the above-stated designated area of the image sensing plane by opening and closing the gate circuit 10. In accordance with the gate pulses output from the gate pulse generating circuit 11, the gate circuit 10 allows to pass there only a signal part which corresponds to the designated area in one field portion of the video signal. A focus detecting area for which the high-frequency component is extracted and passed can be set in a desired part of the image sensing plane in this manner.

The gate pulses output from the gate pulse generating circuit 11 undergoes a signal output action through a display circuit 15. After that, the pulse signal is multiplexed with the TV signal output from the processing circuit 7. As a result, the focus detecting area is superimposed on a monitor screen.

A peak position detecting circuit 12 is arranged to detect the high-frequency component of the video signal which corresponds to the focus detecting area of the image sensing plane and is extracted by the gate circuit 10; to detect the peak level of the high-frequency component obtained within one field amount of picture; and to detect the horizontal and vertical coordinates of a position where the peak level is detected. For detecting the peak position coordinates, the image sensing plane is vertically and horizontally divided into a plurality of blocks. Then, the horizontal and vertical coordinates of one of these blocks in which a peak point of one field amount of the video signal is found are detected. A peak value which is thus detected by the peak position detecting circuit 12 is supplied to an S/H (sample-and-hold) circuit 13 to be sampled and held for every field before it is output from there. After that, information on the peak position coordinates and the peak level is supplied to the control microcomputer 14.

A focus encoder 23 is arranged to detect information on the moving position of the focusing lens 1. A zoom encoder 24 is arranged to detect information on the moving position of the zoom lens 2, i.e., a focal length. An aperture encoder 25 is arranged to detect the aperture value of the iris 3. The results of detection by these encoders are supplied to the control microcomputer 14, which is arranged as described below:

The control microcomputer 14 is arranged to perform overall control for the whole system of the embodiment. The microcomputer 14 includes, besides a CPU, input and output ports, an A/D (analog-to-digital) converter, ROM (read-only memory) and a RAM (random-access memory).

The microcomputer 14 detects the moving position of the object on the basis of data of the peak position detected by the peak position detecting circuit 12; computes a focus detecting area setting position while tracing the object when it moves; and supplies a focus detecting area control signal to the gate pulse generating circuit 11 as a result of the computation. In response to the control signal, the gate pulse generating circuit 11 generates such gate pulses that allow to pass only a video signal part corresponding to the inside of the focus detecting area defined by the focus detecting area control signal. The gate pulses are supplied to the gate circuit 10 to open and close it. The focus detecting area is thus set on the image sensing plane in a position where the peak position as detected is located in the center of the focus detecting area.

Further, the microcomputer 14 computes a depth of field from the output of the zoom encoder 24 and that of the aperture encoder 25. The size, the moving range and the moving response speed of the focus detecting area are controlled on the basis of the computed depth of field.

The microcomputer 14 sends control signals to a driving circuit 16 for controlling the rotating direction, the rotating speed and the start and stop of the motor 19. The focusing lens 1 is thus shifted by the motor 19 toward an in-focus position where the peak level of the high-frequency component output from the S/H circuit 13, i.e., the level of a signal indicating the focused degree of the image of an object, reaches a maximum level.

Further, in response to a zooming instruction given from a zoom operation switch which is not shown, the zoom lens 2 can be driven by means of the zoom lens driving motor 20 by controlling the driving circuit 17.

Figure 2:
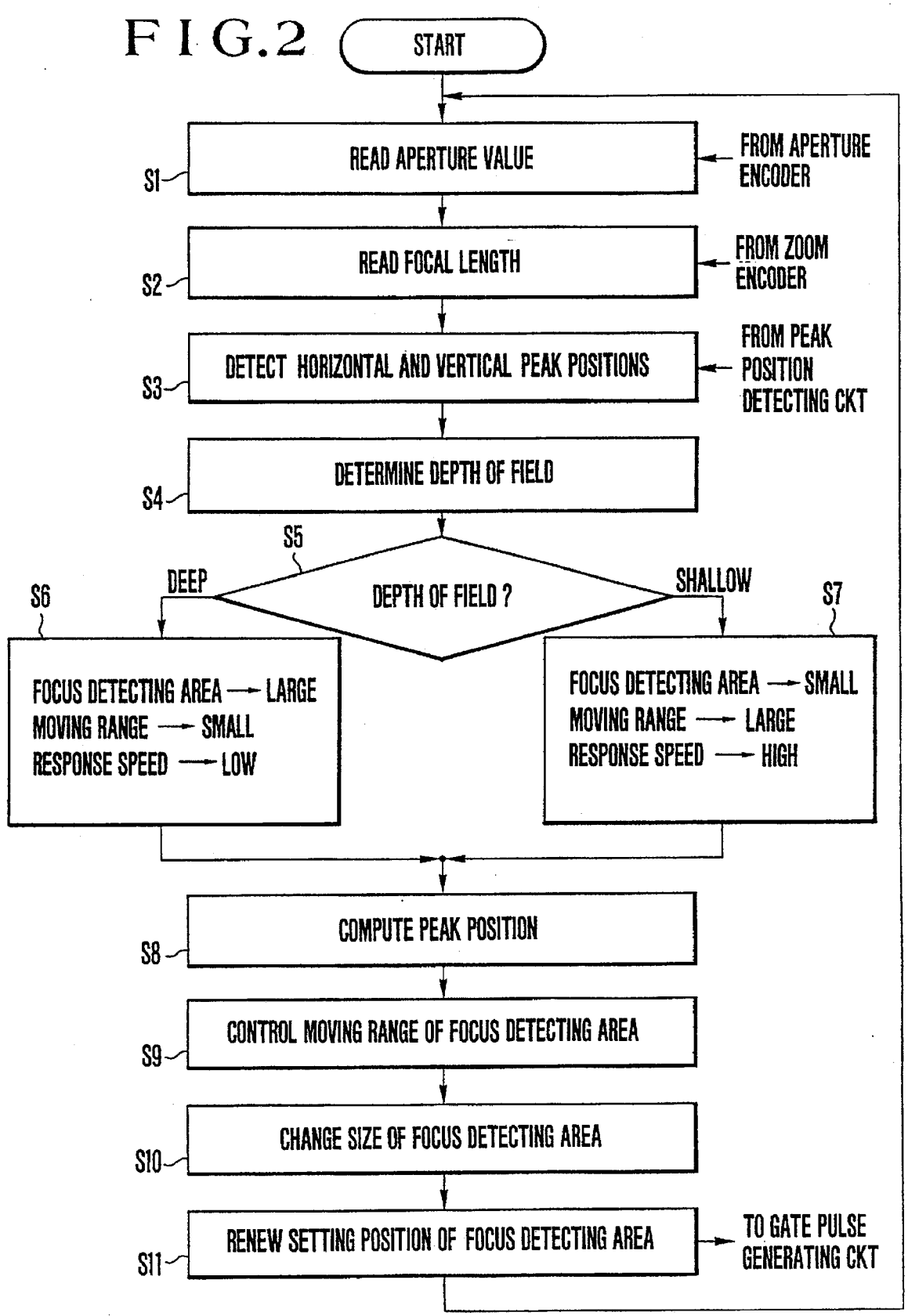
FIG. 2 is a flow chart showing the focus detecting area setting operation of the same automatic focusing device.

With the automatic focusing device arranged as described above according to this invention, the control operation of the control microcomputer 14 on the focus detecting area is performed as described below with reference to the flow chart of FIG. 2:

At a step S1 of FIG. 2: An analog signal indicating an aperture value obtained from the aperture encoder 25 is A/D-converted and stored in the memory of the microcomputer 14 for every field. A step S2: Information on a focal length obtained from the zoom encoder 24 is likewise stored in the form of digital data in the memory of the microcomputer 14 for every field. If the information is in the form of an analog signal, it is A/D-converted before it is stored. At a step S3: Information on the horizontal and vertical coordinates of the peak position on the image plane detected by and output from the peak position detecting circuit 12 is stored in the memory of the microcomputer 14 for every field. Step S4: A depth of field is determined from the aperture data and the focal length data obtained by the steps S1 and S2, by making reference to an information table of FIG. 3 which is stored in the ROM of the microcomputer 14.

Steps S5, S6 and S7: A check is made for the degree of the depth of field determined at the step S4. The size, the moving range and the response speed of the focus detecting area are determined according to the degree of the depth of field.

Step S8: A peak position is computed on the basis of the response speed of the focus detecting area determined by the steps S5 to S7. At a step S9: The moving range of the focus detecting area determined by the steps S5 to S7 is limited. At a step S10: The size of the focus detecting area is changed and adjusted to the size of the focus detecting area determined by the steps S5 to S7. At a step S11: The actual focus detecting area is renewed by supplying a focus detecting area setting control signal to the gate pulse generating circuit 11 according to the focus detecting area setting conditions computed at the above-stated steps.

The flow of control by the microcomputer 14 over the focus detecting area is further described in detail according to the steps of the flow chart of FIG. 2 as follows: After the start of the operation, the flow comes to the step S1. At the step S1, the aperture value information supplied from the aperture encoder 25 is in the form of an analog voltage. The analog voltage aperture value is converted into a digital value by the A/D converter disposed within the microcomputer 14. The digital aperture value is then stored in an area of the RAM in the form of, for example, 8 bit data (256 steps).

At the next step S2, the focal length information, which is output from the zoom encoder 24 and is converted into digital data, is stored in a predetermined area within the RAM. At the step S3, information on the horizontal and vertical position coordinates of the peak point within one field picture, which is output from the peak position detecting circuit 12 and converted into into digital data, is stored in the RAM.

Figures 3, 4:
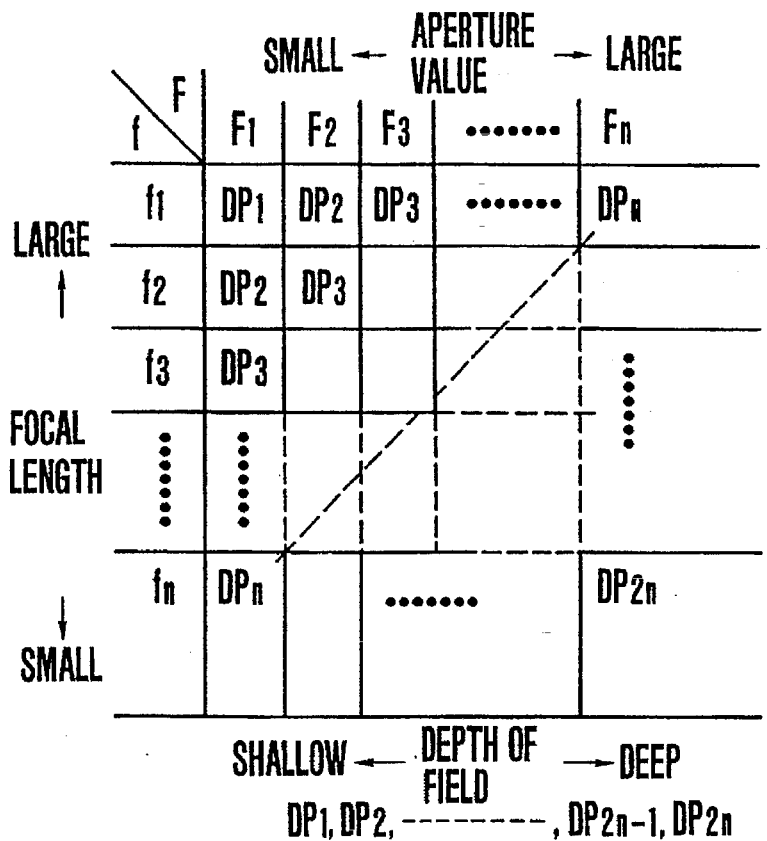
FIG. 3 shows an information table to be used in determining the depth of field.
FIG. 4 shows an information table to be used in determining focus detecting area determining parameters.

At the step S4, data of the depth of field DP is obtained, in accordance with a data table which is stored in the ROM as shown in FIG. 3 for computation of the depth of field, from the aperture value data Fi (i=1, 2, - - -, n) and the focal length data fi (i=1, 2, - - -, n) which are stored at the steps S1 and S2.

The values of the focal length data are in the relation of f1>f2> - - - >fn. The data f1 represents the longest focal length in the case of the device of this embodiment. The relation of the longest focal length to any other focal length fi can be expressed as follows:

$$fi = \left(\frac{1}{\sqrt{2}}\right)^{i-1} f1 \text{ (wherein } i = 1, \text{-}, n) \quad (1)$$

Further, the values of the aperture value data F are in the relation of F1<F2< - - - <Fn. In the case of this embodiment, F1 represent the smallest aperture value which means a full open aperture of the iris. The relation of the smallest aperture value F1 to any other aperture value is in the following relation:

$$Fi = 2^{i-1} F1 \text{ (wherein } i=2, \text{---}, n) \quad (2)$$

With the aperture value expressed as Fi and the focal length as fi, the depth of field DPi can be expressed by and large as follows:

$$DPi = \frac{Fi}{F1} \times \left(\frac{fi}{f1}\right)^2 \times DP1 \ (i = 1, \text{-}, 2n) \quad (3)$$

In this case, the value DP1 represents the depth of field obtained when the iris is fully open and the lens is at its longest focal length. Any desired depth of field DPi is obtainable in accordance with these formulas (1), (2) and (3). It goes without saying that the depth of field data DP1 represents the shallowest depth, which increases accordingly as the data changes to DP2, DP3, - - -.

After the step S4, the flow comes to steps S5, S6 and S7 to execute the routine of determining the conditions for setting the focus detecting area. The size W, the vertical moving range X and the moving response speed SP of the focus detecting area as shown in FIG. 4 are determined on the basis of the depth of field DP obtained at the step S4. The information table required for this is stored beforehand in the ROM of the microcomputer 14.

Referring now to FIG. 4, the values of the depth of field DP are in the relation of DP1<DP2< - - - <DP2n. The values of the size W of the focus detecting area are in the relation of W1<W2< - - - <W2n. The values of the vertical moving range X are in the relation of X1>X2> - - - >X2n. The values of the response speed SP are in the relation of SP1>SP2> - - - >SP2n. The size of the focus detecting area becomes larger, the moving range of it in the vertical direction becomes smaller and the response speed of it becomes slower accordingly as the depth of field increases.

This means that, in cases where the depth of field is deep, an in-focus state is easily obtainable at many points on the image sensing plane irrespective of the position of the main picture-taking object. Under this condition, the peak point of the high-frequency component of the video signal carrying the object image changes and fluctuates too much for performing a normal peak point tracing action.

However, in the event of such a readily focusable condition that results from a deep depth of field, it is less necessary to perform an object tracing action for the purpose of focusing. Therefore, to solve the above-stated problem, the size of the focus detecting area is increased as much as possible under such a condition. This increases the probability of having the image of the main object within the focus detecting area, so that the object tracing action can be accomplished in a more natural manner.

In a case where a zoom action is performed to shift the zoom lens from a telephoto position to a wide-angle position to make the depth of field deeper, the angle of view becomes wider to make the movement of the object relatively slower. As a result, the moving range of the object also becomes narrower, especially in the vertical direction. In such a case, therefore, the response speed of the focus detecting area is lowered by restricting the moving range of the focus detecting area in the vertical direction. This lessens the probability of unnecessary performance of an object tracing action to enable it to be more accurately and more smoothly performed.

Further, in the event of a shallow depth of field, contrary to the above-stated case, there is a great difference in level of the high-frequency component between the object and its background. Therefore, the peak position is clearly detectable. In this instance, therefore, the focus detecting area can be set to a smaller size and can be accurately located in the position of the featuring point of the object. Meanwhile, the moving degree of the object also relatively increases within the angle of view. Both the moving range and the moving response speed of the focus detecting area are increased to follow a large change taking place in the size of the object image.

With the conditions for shifting the focus detecting area determined in the above-stated manner, the flow comes to the step S8 for the peak position computing routine. At the step S8, the microcomputer 14 computes the coordinates of a peak position to be set for the next field on the basis of the response speed SP which has been obtained through the steps S5 to S7.

To avoid the degradation of positioning accuracy due to various factors such as the fluctuations of the peak position within one and the same object image, noises and complex peak position variations resulting from the movement of the object, the peak position coordinates are obtained, for example, by averaging the peak position coordinates detected for a plurality of fields which differ in time from each other.

For example, the positional fluctuations of the peak point within the object image can be removed by obtaining the centroids of horizontal and vertical coordinates of the peak positions of an N number of fields and by averaging them. Further, the peak position fluctuations which are caused by the movement of the object can be removed by the so-called exponential averaging method.

The exponential averaging method is a sort of shift averaging method. In accordance with this averaging method, the weight attaching degree is exponential-functionally reduced accordingly as the point of time at which the data is obtained more precedes the current data. An advantage of this method resides in that the data can be smoothened without storing the past peak position coordinates. More specifically, this can be expressed by the following formula:

$$Xn = \frac{(N-1)}{N} Xn\text{-}1 + \frac{1}{N} xn \quad (4)$$

wherein "N" represents the number of designating times (number of fields); "xn" n-th data; and "Xn" the result of n-th averaging.

Figure 6:
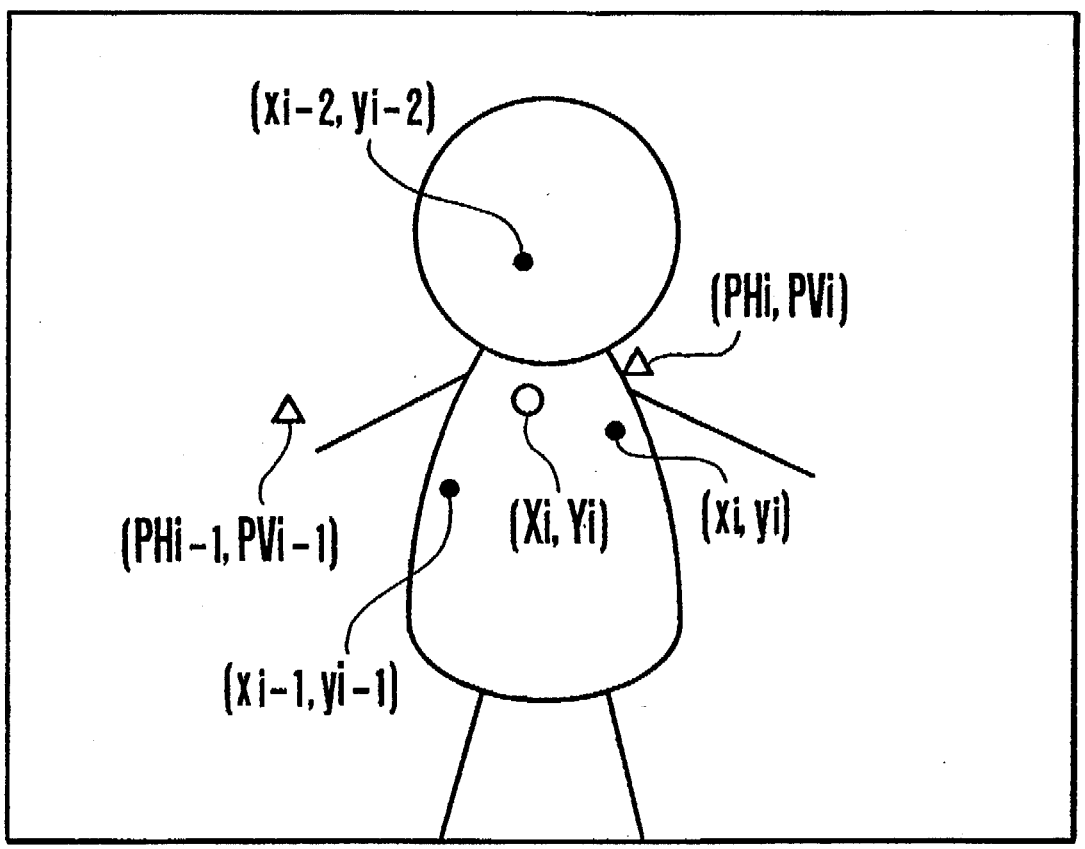
FIG. 6 shows an object movement smoothing action performed according to this invention.

Referring to FIG. 6, more specific description of the above-stated computing operation is as follows:

The peak position is now assumed to be obtained by averaging the data of three fields. The horizontal and vertical coordinates of the peak position of the current field are assumed to be expressed as (xi, yi); and those of fields preceding the current field by one field period and by two field periods to be expressed as (xi–1, yi–1) and as (xi–2, yi–2), respectively.

Position coordinates (Xi, Yi) which are the centroids of the peak position coordinates of the three fields are first obtained by the following formulas:

$$Xi = \frac{(xi + xi\text{-}1 + xi\text{-}2)}{3} \quad (5\text{-}1)$$

$$Yi = \frac{(yi + yi\text{-}1 + yi\text{-}2)}{3} \quad (5\text{-}2)$$

Further, using the centroid position coordinates (Xi, Yi) thus obtained together with peak position coordinates (PHi–1, PVi–1) of the previous fields which are computed by the exponential averaging method and in accordance with Formula (4), peak position coordinates (PHi, PVi) to be used in setting a focus detecting area for the current field are obtained as follows:

$$PHi = \frac{N-1}{N} PHi\text{-}1 + \frac{1}{N} Xi \quad (6\text{-}1)$$

-continued $$PVi = \frac{N-1}{N} PVi\text{-}1 + \frac{1}{N} Yi \quad (6\text{-}2)$$

In the above formulas, "N" represents the number of designating times. However, it shows also the degree of weight attached to the data. The greater the weight, the more precedent the data is. While it gives a greater effect of averaging, it results in a longer delay time. The value N can be changed according to the aperture, the focal length, the degree of focus, etc., to enable the object tracing action to be more appositely performed.

In the peak position setting computation by the exponential method described above, the weight attaching degree, i.e., the value N, is suitably adjusted according to the response speed of the focus detecting area obtained by the steps S5 to S7. Then, with the value N thus adjusted, the focus detecting area for the next field is set by controlling the change of the peak position coordinates between fields, i.e., the moving response speed.

Figure 5A:
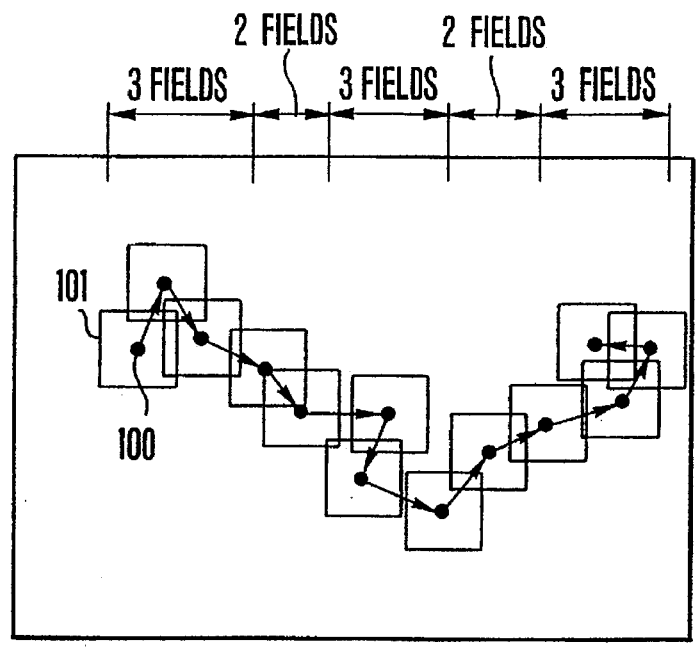
FIGS. 5(a) and 5(b) show in comparison a case where an object tracing action is performed without smoothing computation and another case where an object tracing action is performed with smoothing computation.
Figure 5B:
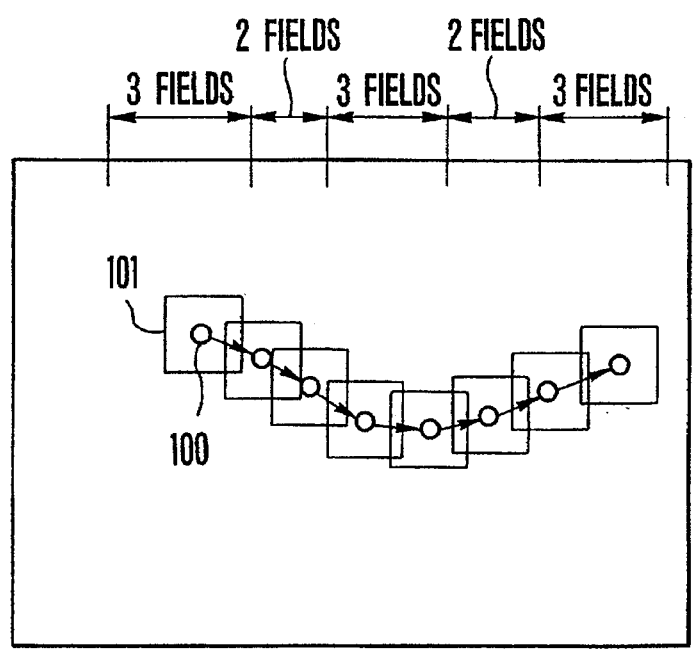

The advantage of the above-stated averaging computation is further described as follows:

FIG. 5(a) shows the movement locus of the focus detecting area and that of the peak position which are obtained in a case where the focus detecting area is shifted in accordance with peak position coordinates computed by using it as it is as the information on the peak position detected for each field. FIG. 5(b) shows the movement locus of the focus detecting area and that of the peak position which are obtained by shifting the focus detecting area on the basis of the peak position coordinates obtained by computing the peak position information of each field in accordance with the exponential averaging method, etc., as in the case of this embodiment.

In each of these drawings, a reference numeral 100 denotes the horizontal and vertical position of the peak point of each field. A numeral 101 denotes the focus detecting area of the image sensing plane set for the field. Further, sections shown above each of these drawings indicate in number of fields the length of time having elapsed in shifting the peak position.

When the peak position of the high-frequency component of the object image having only a minor degree of contrast as in the case of a person or the like is detected, many peak levels of similar values exist in most cases. In such a case, the peak position obtained for one field greatly changes for another field even when the object does not move. The peak position further fluctuates if the object moves. Therefore, where the peak value is detected as a feature point of the object and the focus detecting area is arranged to follow this point, the position of the focus detecting area greatly fluctuates as shown in FIG. 5(a). Then, it becomes hardly possible to stably and accurately trace the object.

Further, when the focus detecting area is displayed on the monitor screen such as a display in an electronic viewfinder, the focus detecting area much vibrates to deteriorate the quality of the display.

The focus detecting area is thus arranged to be set in a position where the horizontal and vertical coordinates (PHi, PVi) of the peak position which are obtained in the above-stated manner are located in the center of the area. Unlike in the case of FIG. 5(a), this invented arrangement enables the focus detecting area to smoothly and accurately trace the movement of the object as shown in FIG. 5(b).

After the step S8, the flow of control operation proceeds to the step S9 for determining a moving range for the focus detecting area. At the step S9, the moving range of the focus detecting area is controlled and monitored, on the basis of the vertical moving range X obtained by the steps S5 to S7, in such a way as to prevent the vertical coordinate value of the focus detecting area obtained by the step S8 from exceeding the moving range. In actuality, it is monitored to prevent the peak position which is set to be in the center of the focus detecting area from exceeding the moving range. If the vertical coordinate value comes to exceed the moving range, control is performed to reset the vertical coordinate value.

At the step S10 for changing the size of the focus detecting area, the size of the focus detecting area is set likewise on the basis of the value W obtained by the steps S5 to S7. At the step S11, data for setting the focus detecting area is supplied to the gate pulse generating circuit 11 in accordance with the conditions for setting the focus detecting area computed in the above-stated manner. The actual renewal of the focus detecting area is effected by controlling the opening and closing operation of the gate circuit 10 by means of the setting data. The object tracing action can be thus accomplished always in a natural and apposite manner irrespective of the depth of field. After that, the flow comes back to the step S1 to repeat the above-stated flow of operation.

In the flow chart described above, the depth of field is checked for its magnitude at the step S5 and the flow branches to the step S6 or S7 according to the result of the check. However, this merely shows, for the sake of simplification of illustration, the concept of varying the size, the moving range and the response speed of the focus detecting area according to the depth of field. However, as apparent from the foregoing description, these values are not changed only by two steps. In actuality, the microcomputer finely sets and adjusts them according to the information table shown in FIG. 4.

Figure 7:
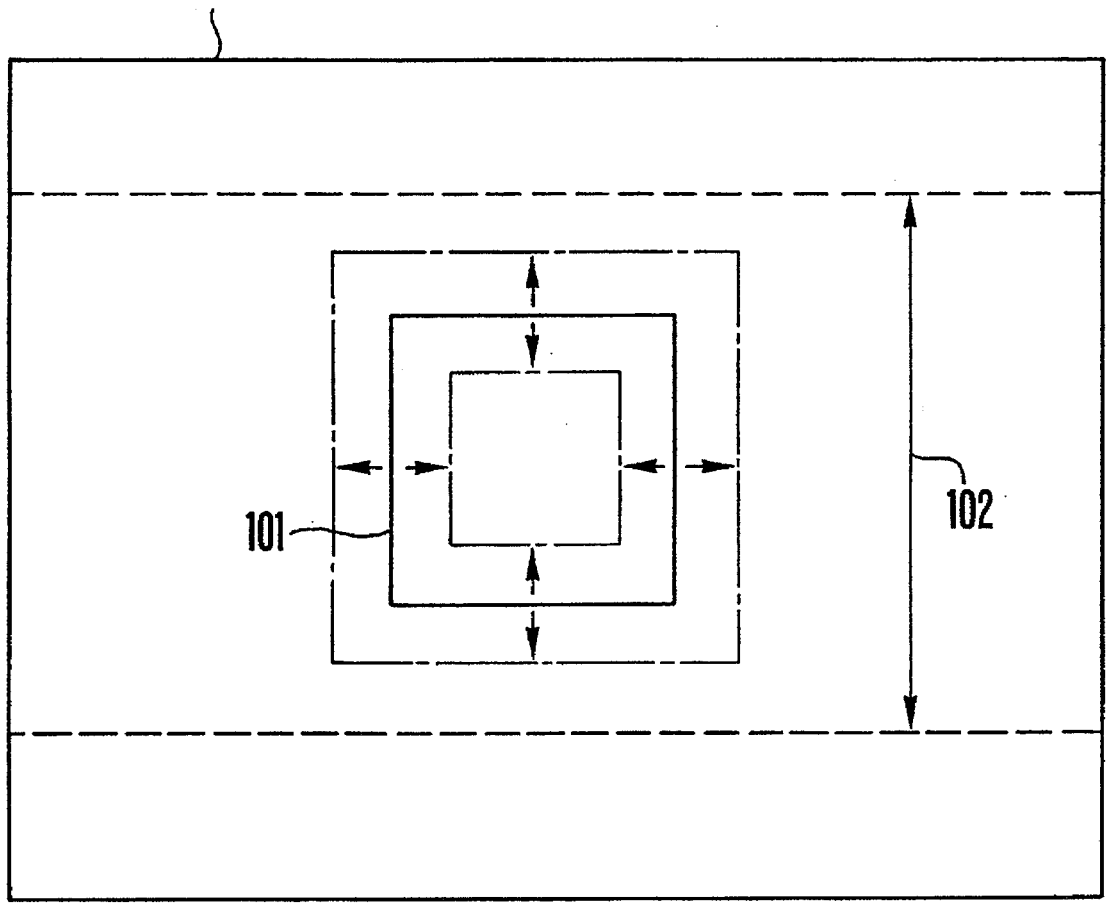
FIG. 7 conceptionally shows a focus detecting area set on an image sensing plane.

FIG. 7 schematically shows the focus detecting area set on the image sensing plane. In FIG. 7, a reference numeral 101 denotes the focus detecting area and a numeral 102 the moving range of the focus detecting area.

Further, in the foregoing, the embodiment has been described as arranged to vary the response speed of the focus detecting area by varying the weight attaching degree of the exponential averaging operation in setting the focus detecting area. However, the invention is not limited to this method. The response speed can be lowered apparently, for example, by changing the renewing interval of the focus detecting area from the intervals of one field to the intervals of two or three fields. A modification made in this manner gives the same advantageous effect as the embodiment described.

The embodiment has been described in the foregoing as arranged to vary all the three parameters including the size, the moving range and the response speed of the focus detecting area according to the depth of field. However, the same advantageous effect is attainable without simultaneously varying all these parameters. The same effect is attainable by varying at least one of them. It is, therefore, possible to set a plurality of modes and to select them according to the allowable cost of the camera or the condition of the object. Such arrangement alleviates a computing load on the control microcomputer.

As described in the foregoing, the automatic focusing device which is of the kind continuously performing a focusing action on a picture-taking object by moving a focus detecting area to trace the movement of the object is arranged according to this invention to be capable of performing an object tracing action appositely to the depth of field of a photo-taking optical system by controlling at least one of the size, the moving range and the moving response speed of the focus detecting area according to the depth of field. The arrangement ensures that the object can be stably and continuously kept within the focus detecting area even when the condition of the object is changed by a change occurred in the depth of field as a result of an aperture adjusting action or a zooming action. Therefore, the object tracing action can be accurately accomplished for accurate focus adjustment.

Figure 8:
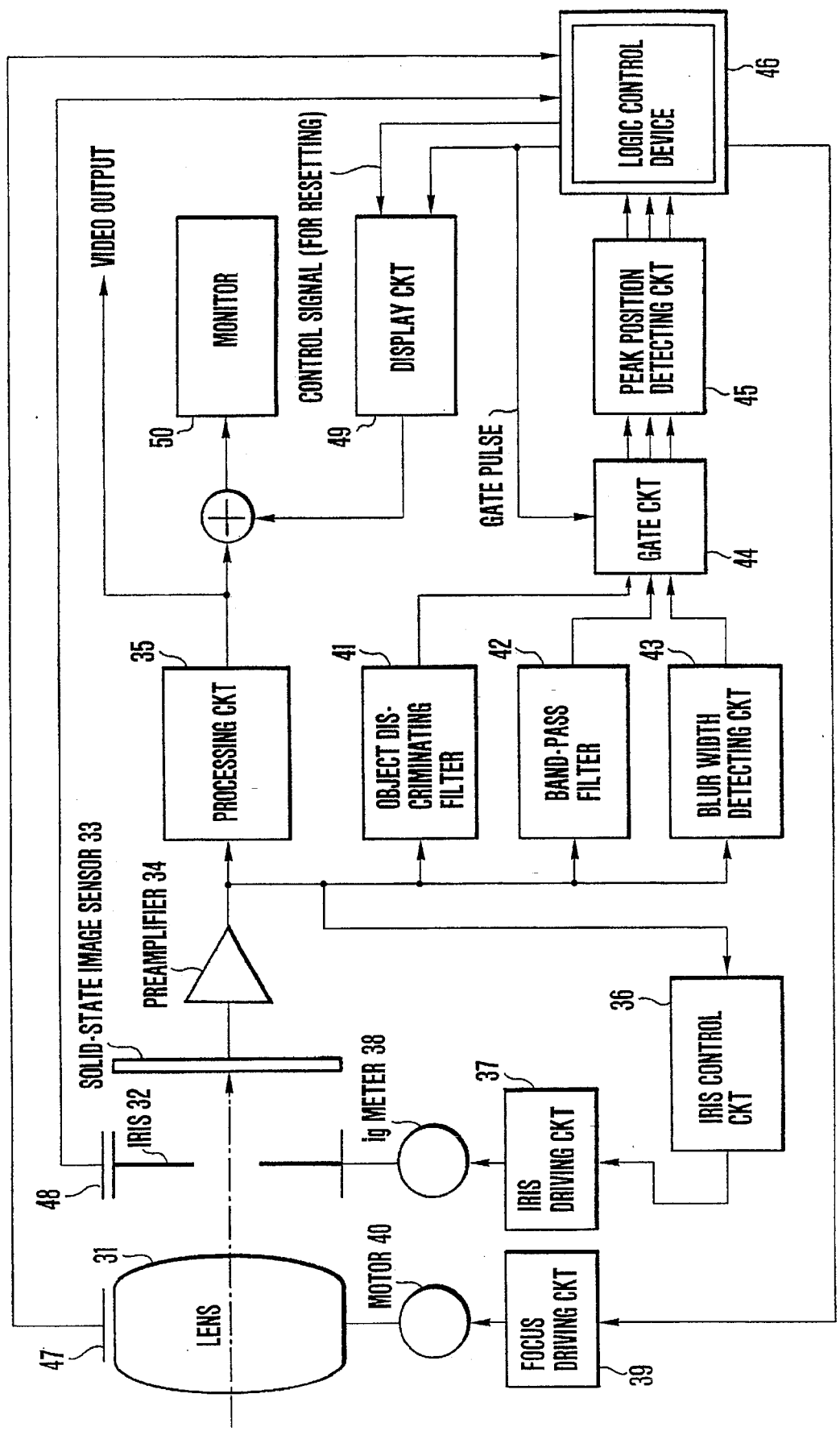
FIG. 8 is a block diagram showing an image sensing device arranged as a second embodiment of the invention.
Figure 9:
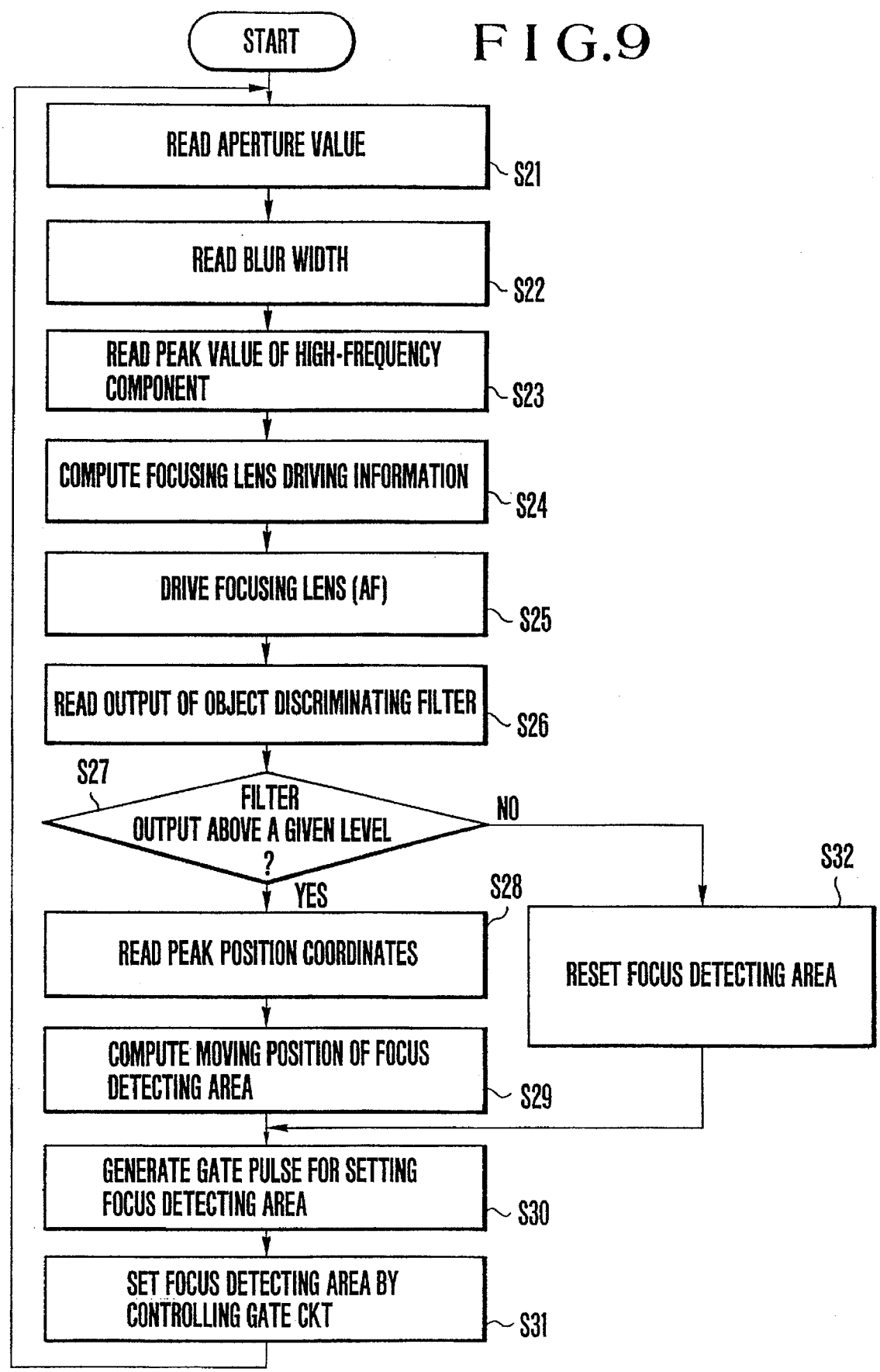
FIG. 9 is a flow chart showing the control operation of the second embodiment.
Figure 10:
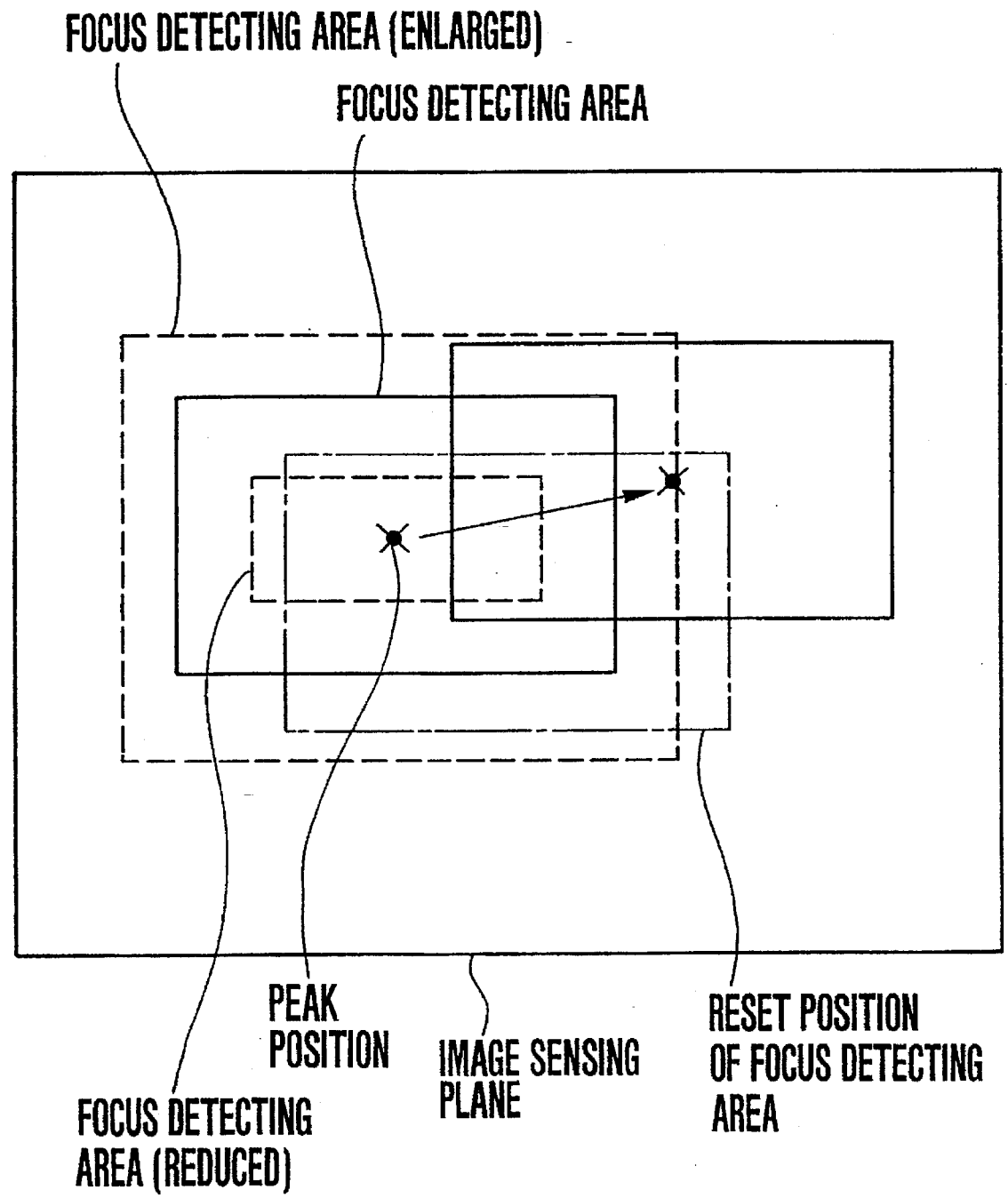
FIG. 10 shows a relation among the setting positions of the focus detecting area set on an image sensing plane according to this invention.

FIGS. 8, 9 and 10 show a second embodiment of this invention. The second embodiment is an image sensing device of the kind movably setting a given detecting area on an image sensing plane. A feature of the image sensing device lies in that: When it becomes impossible to compute a setting position for renewal of the current setting position of the detecting area due to some cause such as a change in the conditions of a picture-taking object, the renewal is suspended and the detecting area is set in a predetermined standard position. The details of the image sensing device (or an automatic focusing device) which is the second embodiment of the invention are as follows:

FIG. 8 is a block diagram showing the invented automatic focusing device in a state of being applied to a video camera or the like. Referring to FIG. 8, a focusing lens 31 is provided for focus adjustment and is arranged to be driven and controlled through a focus driving circuit 39 and a focusing motor 40. An iris 32 is provided for controlling the quantity of incident light and is arranged to be driven and controlled through an iris driving circuit 37 and an iris driving IG meter 38. An image sensor 33 which is a CCD or the like is arranged to photo-electrically convert the image of the object formed on the image sensing plane by the focusing lens 31 into a video signal. A preamplifier 34 is arranged to amplify up to a given level the video signal output from the image sensor 33. A processing circuit 35 is arranged to perform predetermined processes on the video signal output from the preamplifier 34, including a gamma correction process, a blanking process, a synchronizing signal adding process, etc., to convert it into a standard TV signal and to output the TV signal from a video output terminal. The TV signal output from the processing circuit 35 is supplied either to a video recorder which is not shown or to a monitor 50 such as an electronic viewfinder or the like.

An iris control circuit 36 is arranged to receive the video signal from the preamplifier 34 and to automatically control the IG meter 38 via the iris driving circuit 37 to cause the aperture of the iris 32 adjusted in such a way as to have the video signal at a given constant level. A total band filter (or object discriminating filter) 41 is arranged to be capable of detecting the degree of contrast of the object image through the video signal output from the preamplifier 34. A band-pass filter 42 is arranged to extract, from the video signal coming from the preamplifier 34, a high-frequency component to be used for focus detection. A blur width detecting circuit 43 is arranged to detect the width of blur of the object image (the width of the edge part of the image). The blur width of the object image decreases accordingly as it comes closer to an in-focus state. The circuit 43 operates by utilizing this nature of the blur width. The focus detecting method employed for the blur width detecting circuit 43 has been known, for example, from Japanese Laid-Open Patent Application No. SHO 62-103616, etc.. Therefore, the details of this method are omitted from the following description.

A gate circuit 44 is arranged to perform a gating action on the output of the band-pass filter 42 and that of the blur width detecting circuit 43 and to pass only the portions of these outputs that correspond to a designated area of the image sensing plane. More specifically, in accordance with gate pulses supplied from a logic control device 46, the gate circuit 44 passes the signal portion that corresponds to the designated area within one field amount of the video signal. The gating action is performed in such a way as to set a focus detecting area in an arbitrarily selected position within the image sensing plane and to extract and pass the high-frequency component of the signal portion which corresponds to the focus detecting area. The details of the focus detecting area which is set in this manner on the image sensing plane is as shown in FIG. 10.

A peak position detecting circuit 45 is arranged to detect the vertical and horizontal positions of a point where the peak value of the high-frequency component is detected from the video signal portion which corresponds to the inside of the focus detecting area and is extracted through the gate circuit 44. For this purpose, the focus detecting area is divided into a given number of blocks both in the horizontal and vertical directions of the area. The circuit 45 is thus arranged to detect one of these divided parts (blocks) of the area in which the peak position is detected during one field period. The circuit 45 then produces the horizontal and vertical coordinates which define the peak detection position.

A focusing encoder 47 is arranged to detect the shifting position of the focusing lens 31. An iris (aperture) encoder 48 is arranged to detect the aperture position of the iris 32.

The logic control device 46 controls the whole system of the device and is arranged as follows: The peak value of the high-frequency component which is obtained within one field period on the basis of the output of the band-pass filter 42 and the peak position coordinates are supplied from the peak position detecting circuit 45 to the logic control device 46. Information on the contrast of the object which is based on the output of the object discriminating filter 41 and information on the blur width which is based on the output of the blur width detecting circuit 43 are also supplied to the control device 46. The control device 46 performs a computing operation on these inputs in accordance with a predetermined algorithm. The control device 46 then sets the position and size on the image sensing plane of the focus detecting area, i.e., performs an automatic object tracing action, according to changes time-serially taking place in these inputs. The control device 46 also computes a focusing lens shifting speed as well as the focusing lens shifting direction to an in-focus position. The control device 46 is, for example, composed of a microcomputer and includes input and output ports, an A/D converter, a read-only memory (ROM) and a random-access memory (RAM) which are not shown.

In other words, the control device 46 detects from the output of the band-pass filter 42, for every field, the movement of the object on the basis of the peak value of the high-frequency component detected within one field period and the coordinates of a position where the peak value is detected. Then, to set the focus detecting area in a part of the image sensing plane where the peak detection position is located in the center of the area, the control device 46 supplies the gate pulses to the gate circuit 44 to open and close the latter. The gate circuit 44 then passes only the video signal portion corresponding to the focus detecting area.

Further, the logic control device 46 makes focus adjustment by detecting a focused state of the object image on the basis of the video signal portion corresponding to the focus detecting area which is set as mentioned above. More specifically, the focus adjustment is made in the following manner: With the blur width information obtained from the blur width detecting circuit 43 and the peak value information of the high-frequency component from the band-pass filter 42, a control signal for controlling the rotating direction, the rotating speed and the start and stop of the focusing motor 40 is supplied to the focus driving circuit 39 to shift the focusing lens 31 to a position where the blur width becomes the minimum value and the peak value of the high-frequency component reaches the maximum value during the one-field period.

In this instance, the logic control device 46 controls the size, the moving range and the moving response speed of the focus detecting area according to the degree of focus and also according to the depth of field which is computed from an aperture value detected by the iris encoder 48. The focus is thus continuously adjustable on a moving object by following it.

The embodiment is arranged to use for focus detection the blur width signal output from the blur width detection circuit 43 and the peak value of the high-frequency component output from the band-pass filter 42. The reason for this is as follows: The blur width becomes smaller accordingly as the focused state comes closer to an in-focus point and reaches a minimum value at the in-focus point. The use of the blur width gives a high degree of focus detecting accuracy as it is not readily affected by the contrast of the object. However, a disadvantage of it resides in its narrow dynamic range which prevents attainment of a sufficient detection accuracy when the focused state greatly deviates from the in-focus point.

Whereas, the high-frequency component has a wide dynamic range to give an output corresponding to the degree of focus even when it greatly deviates from the in-focus point. A disadvantage of the use of the high-frequency component, on the other hand, resides in its excessive vulnerability to the adverse effect of the contrast of the object. Therefore, the degree of focusing accuracy attainable by the use of high-frequency component as a whole is lower than the degree of accuracy attainable by the use of blur width.

The embodiment, therefore, employs a focus detecting method which combines these two methods to have a wide dynamic range and a high degree of detecting accuracy in the vicinity of the in-focus point.

Further, the logic control device 46 continuously detects, on the basis of the output of the object discriminating filter 41, the contrast of image obtained within the focus detecting area of the image sensing plane to make a discrimination between the presence and absence of the object within the image sensing plane.

It is hardly possible to discriminate the object in cases where the object image comes outside of the image sensing plane or where there is little contrast between the picture-taking object and its background due to an excessive degree of blur. Under such a condition, a faulty action tends to be performed to prevent accurate focus adjustment, because the object is not readily distinguishable and cannot be accurately traced.

In view of this, the embodiment is arranged to find the presence or absence of the object from the contrast state of the image sensing plane. In the event of absence of the object, the movement of the focus detecting area, i.e. an object tracing action, is brought to a stop to prevent any faulty action due to erroneous detection of something other than the object by an irregular movement of the focus detecting area.

The gate pulses output from the logic control device 46 are supplied not only to the gate circuit 44 but also to a display circuit 49 to be subjected to a given signal processing action. A signal thus obtained through the display circuit 49 is multiplexed along with the TV signal which is output from the processing circuit 35. The multiplex signal is then supplied to the monitor 50, so that the focus detecting area can be superimposed on the display screen of the monitor.

The automatic focusing device which is arranged in the above-stated manner as a second embodiment of the invention performs a control operation on the focus detecting area as described below with reference to FIG. 9 which shows the flow of the operation in a flow chart:

Referring to FIG. 9, the flow comes to a step S21 upon the start of the control operation. At the step S21: An aperture value detected by the iris encoder 48 for every field is read and stored in the memory disposed within the logic control device 46. At steps S22 and S23: The blur width information output for the field from the blur width detecting circuit 43 and the peak value information output for the same field from the band-pass filter 42 are respectively A/D-converted and stored in the memory within the logic control device 46. At a step S24: A focused state is detected from the data of aperture value, the blur width and the peak value of the high-frequency component obtained at the steps S21 to S23. The direction and the speed of driving the focusing lens 31 are determined according to the result of focus detection. In this instance, the focusing lens driving or shifting speed is adjusted in consideration of the depth of field obtained from the aperture value. The depth of field and the lens driving speed are determined with reference to an information table which has previously been stored within the ROM of the logic control device 46. The use of this table shortens a length of time required for computation and simplifies the control program.

At a step S25: The focusing lens driving data, i.e., control signals for the focusing motor driving speed, the driving direction and the start and stop of the motor, is supplied to the focus driving circuit 39. The focusing motor 40 is then driven to shift the focusing lens 31 toward an in-focus position.

At a step S63: Contrast information which is output from the object discriminating filter 41 in an analog form for one field is A/D-converted into digital data and is stored in an applicable area set within the logic control device 46. At a step S27: The degree of contrast of the object is determined by carrying out a computing operation. More specifically, the contrast of the object is determined by comparing the information on the level of a luminance signal output from the object discriminating filter 41 with a given threshold value. After that, a check is made to see whether the automatic object tracing can be accomplished with a high degree of accuracy on the basis of changes taking place in the peak value of the high-frequency component or the level of the luminance signal is too low for accurately tracing the object.

If it is ascertained, at the step S27, that the object can be accurately traced because of a sufficient high contrast of the object and the presence of the object image within the focus detecting area, the flow comes to a step S28. At the step S28: The horizontal and vertical coordinates of a position at which the peak value of the high-frequency component is detected are taken in the logic control device 46 and are A/D-converted into data to be stored in an applicable storage area.

At a step S29: In accordance with the information on the horizontal and vertical coordinates of the peak value detection position of the high-frequency component obtained at the step S28, the logic control device 46 computes a moving position to which the setting position of the focus detecting area is to be shifted for having the above-stated peak position located in the center of the area. In this instance, the focus detecting area can be stably set without being affected by noises, etc., by determining the setting position not merely by comparing the data of the current field with the data of the previous field but also by obtaining the average of data for a given number of past fields.

At a step S30: To shift the focus detecting area to a position computed at the step S29, the gate pulses are supplied to the gate circuit 44. The setting position within the image sensing plane of the focus detecting area is renewed accordingly. The flow then comes back to the step S21 to repeat the flow of control operation for the next field. A moving object thus can be automatically traced by the focus detecting area by detecting any change taking place in the peak detection position in the above-stated manner.

With the information on the object luminance which is obtained from the object discriminating filter 41 computed at the step S27, if the result of computation indicates a low degree of luminance which is too low for accurately tracing the object, it means either the absence of the object within the focus detecting area or an extremely blurred state which is too blurred for distinguishing the object. If the object tracing action is continuously performed despite this condition, the action not only becomes erroneous but also makes focus adjustment difficult because of unstable movement of the focus detecting area. In that instance, therefore, the flow comes to a step S32 to forcibly set the focus detecting area in a reset position by suspending the object tracing action. In performing this reset action on the focus detecting area, reset position coordinates are set beforehand, for example, approximately in the center of the image sensing plane and the flow comes to a step S30. Then, at the step S30, the gate pulses are supplied to the gate circuit 44 according to the reset position. (The reset position of the focus detecting area is as shown in FIG. 10). By this, the focus detecting area is prevented from making an irregular movement when the object cannot be traced.

Further, the embodiment may be arranged to make a flickering display of the focus detecting area or some other warning display or to produce some warning sound to invite the attention of the operator in this instance.

With the above-stated flow of control operation repeated in the cycle of field period, a moving object can be automatically traced while a focusing action is continuously carried out.

At the step S29 which is the routine of setting the position of the focus detecting area, i.e., the object tracing position setting routine, the setting position of the focus detecting area for the next field is computed according to the coordinates of the peak position of the high-frequency component. In that instance, the object can be traced more appositely to the condition of the object by simultaneously controlling the size and the moving response speed of the focus detecting area according to the depth of field detected at the step S21. For this purpose, an information table showing the sizes and the moving speeds of the focus detecting area that are apposite to different depth of field may be stored beforehand in the ROM disposed within the logic control device 46 and the above-stated setting action is performed by making reference to the information table.

More specifically, the setting action is performed as follows: When the depth of field is deep, the size of the focus detecting area is increased; the vertical moving range of the area is decreased; and the response speed of the area is slowed down, because: The in-focus state tends to be obtained at many points on the image sensing plane irrespective of the image of the main picture-taking object in the case of deep depth of field. In that case, therefore, the peak point of the high-frequency component of the image fluctuates too much for tracing the peak point regularly or in a normal manner. In other words, the degree of necessity of tracing the object for the purpose of focusing decreases in cases where an in-focus state is readily obtained because of the deep depth of field. Under such a condition, therefore, the size of the focus detecting area is increased as much as possible for an increased probability of having the image of the main object within the focus detecting area. This arrangement enables the embodiment to perform the object tracing action in a more natural manner.

In the event of a shallow depth of field on the other hand, the focused degree greatly changes between in-focus and out-of-focus states to facilitate focusing on the main object. The peak value of the high-frequency component which indicates on the image sensing plane the feature of the object also can be easily detected. Therefore, in this instance, the control operation is performed in such a way as to reduce the size of the focus detecting area, to accurately focus the lens on the main object and to accurately trace the movement of the object.

FIG. 10 shows the control over the size of the focus detecting area. As described in the foregoing, the output of the object discriminating filter for the image obtained within the focus detecting area is monitored in shooting an object by tracing it. The flow of control operation then forks into two branches, one for a traceable state and the other for an untraceable state according to the magnitude of the output. This enables the embodiment to shoot the object while smoothly and naturally tracing the object by controlling the focus detecting area according to the state of the output.

The embodiment is, as described above, arranged to make a discrimination between an object traceable state and an untraceable state by using the object discriminating filter which is composed of a total band filter. However, the invention is not limited to the use of this filter. The state of the object can be likewise distinguished by using, for example, the output of the band-pass filter and that of the blur width detecting circuit mentioned in the foregoing.

As described in the foregoing, the invented automatic focusing device is provided with means for making a discrimination between the presence and absence of the object within the focus detecting area. The algorithm for controlling the focus detecting area is changed according to whether the object is traceable or untraceable in such a way as to perform optimum control for each of different states of the object. The invented device, therefore, enables the camera to perform stable and high-quality shooting by tracing the object and to perform accurate and natural shooting even in cases where the object is in an untraceable state.

What is claimed is:

1. An image processing apparatus, comprising:
   a) setting means for movably setting a detecting area in an image screen;
   b) detecting means for detecting a predetermined information obtained within said detecting area;
   c) computing means for computing a setting position of said detecting area; and
   d) control means arranged to move said detecting area on the basis of an output of said computing means and to control and vary the movable range of said detecting area in said image screen and/or the moving response speed of said detecting area on the basis of information on a depth of field.

2. A device according to claim 1, further comprising image sensing means arranged to convert an image formed on the image sensing plane into an electrical signal to output an image signal, said detecting means being arranged to detect said predetermined information from the image signal output from by said image sensing means.

3. A device according to claim 2, wherein said information is a signal indicating a feature of an object image formed on the image sensing plane.

4. A device according to claim 3, wherein said information relates to a peak value of a high-frequency component of the image signal and/or a peak value of information corresponding to an edge component of the object image.

5. A device according to claim 3, wherein said computing means is arranged to detect the movement of object image by detecting in the cycle of field period a signal indicating the feature of the object image and to determine the setting position of said detecting area.

6. A device according to claim 1, wherein said moving response characteristic of said detecting area is a moving response speed of said detecting area, and wherein said control means is arranged to vary stepwise at least one of the size, the moving range and the moving response speed of said detecting area according to said information on photo-taking conditions.

7. A device according to claim 6, wherein data for each of the size, the moving range and the moving response speed of said detecting area corresponding to said information on photo-taking conditions are stored in a memory in the form of a table.

8. A device according to claim 7, wherein said control means is arranged to increase the size of said detecting area and decrease the moving range and the moving response speed thereof when the depth of field is deep and to decrease the size of said detecting area and increase the moving range and the moving response speed thereof when the depth of field is shallow.

9. A device according to claim 1, wherein said computing means is arranged to compute the position of said detecting area by averaging in accordance with a predetermined algorithm a plurality of values of said information detected at different points of time.

10. An automatic focusing device capable of moving within an image sensing plane a focus detecting area for detecting the degree of focus of an object image formed on the image sensing plane, comprising:
    a) detecting means for detecting the object image within the image sensing plane;
    b) computing means for computing a setting position of said focus detecting area; and
    c) control means arranged to set said focus detecting area in the setting position computed by said computing means and to control and vary the movable range of said focus detecting area in said image sensing plane and the moving response speed of said focus detecting area on the basis of information on a depth of field.

11. A device according to claim 10, further comprising image sensing means arranged to convert into an electrical signal an image formed on the image sensing plane to output an image signal, said detecting means being arranged to detect the position of the object image by detecting a signal indicating a feature of the object image from the image signal output from said image sensing means.

12. A device according to claim 11, wherein said computing means is arranged to compute the moving position of the object image by detecting an output of said detecting means in the cycle of field period.

13. A device according to claim 10, wherein said information on photo-taking conditions is information on the depth of field of a photo-taking optical system which forms the object image on the image sensing plane.

14. A device according to claim 10, wherein said control means is arranged to vary stepwise the size, the moving range and the moving response speed of said focus detecting area.

15. A device according to claim 14, wherein said moving response characteristic of said focus detecting area is a moving response speed of said focus detecting area, and wherein data for the size, the moving range and the moving response speed of said focus detecting area corresponding to said information on photo-taking conditions are stored in a memory in the form of a table.

16. A device according to claim 10, wherein said control means is arranged to increase the size of said focus detecting area and decrease the moving range and the moving response speed thereof when the depth of field is deep and to decrease the size of said focus detecting area and increase the moving range and the moving response speed thereof when the depth of field is shallow.

17. A device according to claim 10, wherein said computing means is arranged to compute the position of said focus detecting area by averaging in accordance with a predetermined algorithm a plurality of values of said information detected at different points of time.

18. An image sensing apparatus, comprising:
 a) image sensing means arranged to photo-electrically convert an object image formed on the image sensing plane to output an image signal;
 b) detecting means for detecting predetermined information representing a feature of an object image from the image signal corresponding to said detecting area;
 c) area setting means arranged to compute a setting position of said detecting area and to move said detecting area to the setting position as computed;
 d) discriminating means for discriminating whether the object can be detected from the image signal; and
 e) control means for setting said detecting area in a predetermined position by suspending renewal of the setting position of said detecting area when a computing operation of the setting position of said detecting area by said area setting means is discriminated impossible according to said discriminating means.

19. A device according to claim 18, wherein said detecting area is a focus detecting area which is used for detecting the state of focus of an object image.

20. An image sensing device capable of movably setting within an image sensing plane a detecting area for detecting predetermined information on an image formed on the image sensing plane, comprising:
 a) detecting means for detecting said predetermined information from the image formed on the image sensing plane;
 b) computing means for computing a setting position of said detecting area; and
 c) control means for varying and controlling the moving range and/or the moving response speed of said detecting area on the basis of a depth of field.

21. A device according to claim 20, wherein said detecting means is arranged to detect said predetermined information from an image signal output from image sensing means for photo-electrically converting the image formed on the image sensing plane.

22. A device according to claim 21, wherein said predetermined information is information on the position of the image.

23. A device according to claim 20, wherein data for the moving range and/or the moving response speed of said detecting area is stored in a memory in the form of a table.

24. A device according to claim 20, wherein said information on the operating state of said photo-taking optical system is information on the depth of field.

25. A device according to claim 20, wherein said control means is arranged to restrict the moving range of said detecting area in the vertical direction of the image sensing plane.

26. A device according to claim 20, wherein said control means is arranged to vary a size of said detecting area in the vertical direction of the image sensing plane.

27. An image sensing device capable of movably setting within an image sensing plane a detecting area for detecting the state of an image formed on the image sensing plane, comprising:
 a) image sensing means for photo-electrically converting the image on the image sensing plane to output an image signal;
 a') zooming means for zooming the image on said image sensing plane;
 b) detecting means for detecting predetermined information from the image signal;
 c) computing means for computing a setting position of said detecting area; and
 d) control means for simultaneously varying the moving range and/or the moving response speed of said detecting area, on the basis of a magnification state of said zooming means, when said detecting area is set on the basis of the output of said computing means.

28. A device according to claim 27, wherein said control means is arranged to control a size, the moving range and the moving response speed of said detecting area in accordance with the depth of field.

29. A device according to claim 28, wherein said control means is arranged to increase the size of said detecting area and decrease the moving range and the moving response speed thereof when the depth of field is deep and to decrease the size of said detecting area and increase the moving range and the moving response speed thereof when the depth of field is shallow.

30. A device according to claim 27 or 29, wherein said detecting area is a focus detecting area which is set for detecting a focused state of the image.

31. A video camera, comprising:
 a) setting means for movably setting a detecting area in an image sensing plane;
 b) detecting means for detecting a predetermined information obtained within said detecting area;
 b') zooming means for zooming the image on said image sensing plane;
 c) computing means for computing a setting position of said detecting area; and
 d) control means arranged to move said detecting area on the basis of an output of said computing means and to control and vary the movable range of said detecting area in said image sensing plane on the basis of information on a magnification condition of said zooming means.

32. A device according to claim 31, wherein said setting means, computing means and control means are arranged to operate on a V-sync signal.

33. A device according to claim 32, wherein said predetermined information is a high frequency component in the image signal.

34. A device according to claim 31, wherein said computing means is arranged to effect averaging computation of information concerning a plurality of past set positions of said detecting area to calculate a next set position.

35. A device according to claim 31, wherein said information is an information concerning depth of field and said moving range is a moving range of the upward and downward movement of the detecting area in which the moving range is increased when the depth of field is shallower, while the moving range is decreased when the depth of field is deeper.

36. A device according to claim 35, wherein said computing means is arranged to effect averaging computation of information concerning a plurality of past set positions of said detecting area to calculate a next set position.

37. A device according to claim 35, wherein said detecting means is arranged to detect a characteristic feature of an object image on the basis of a high frequency component in the image signal.

38. A video camera, comprising:
   a) setting means for movably setting a detecting area in an image sensing plane;
   a') zooming means for zooming the image on said image sensing plane;
   b) detecting means for detecting a predetermined information obtained within said detecting area;
   c) computing means for computing a setting position of said detecting area; and
   d) control means arranged to move said detecting area on the basis of an output of said computing means and to control and vary the moving response speed of said detecting area in said image sensing plane on the basis of information on a magnification condition of said zooming means.

39. A device according to claim 38, wherein said information is an information concerning a depth of field, and said moving response characteristic includes motion responding speed of the decting area, in which the motion responding speed is increased when the depth of field is shallower, while the motion responding speed is decreased when the depth of field is deeper.

40. An automatic focusing device capable of moving within an image sensing plane a focus detecting area for detecting the degree of focus of an object image formed on the image sensing plane, comprising:
   a) detecting means for detecting the object image within the image sensing plane;
   b) computing means for computing a setting position of said focus detecting area; and
   c) control means arranged to set said focus detecting area in the setting position computed by said computing means and to control and vary the movable range of said focus detecting area in said image sensing plane on the basis of information on a depth of field.

41. A device according to claim 40, wherein said setting means, computing means and control means are arranged to operate on a V-sync signal.

42. A device according to claim 40, wherein said computing means is arranged to effect averaging computation of information concerning a plurality of past set positions of said detecting area to calculate a next set position.

43. A device according to claim 40, wherein said information is an information concerning depth of field and said moving range is a moving range of the upward and downward movement of the detecting area, in which the moving range is increased when the he depth of field is shallower, while the moving range is decreased when the depth of filed is deeper.

44. An automatic focusing device capable of moving within an image sensing plane a focus detecting area for detecting the degree of focus of an object image formed on the image sensing plane, comprising:
   a) detecting means for detecting the object image within the image sensing plane;
   b) computing means for computing a setting position of said focus detecting area; and
   c) control means arranged to set said focus detecting area in the setting position computed by said computing means and to control and vary the moving response speed of said focus detecting area in said image sensing plane on the basis of information on a depth of field.

45. A device according to claim 44, wherein said information is an information concerning a depth of field, and said moving response characteristic includes a motion responding speed of the detecting area, in which the motion responding speed is increased when the depth of field is shallower, while the motion responding speed is decreased when the depth of field is deeper.

46. A device according to claim 44, wherein said detecting means is arranged to detect a characteristic feature of an object image on the basis of a high frequency component in the image signal.

47. A device according to claim 44, wherein said computing means is arranged to effect averaging computation of information concerning a plurality of past set positions of said detecting area to calculate a next set position.

48. An image processing apparatus, comprising:
   a) setting means for movably setting a processing area in an image screen;
   b) processing means for processing a predetermined information obtained within said processing area;
   c) computing means for computing a setting position of said processing area; and
   d) control means arranged to move said processing area on the basis of an output of said computing means and to control and vary the movable range of said processing area in said image screen and/or the moving response speed of said processing areas in said image screen on the basis of information on a magnification condition of an image on said image screen.

49. An apparatus according to claim 48, wherein said processing area is a focus detecting area.

50. An apparatus according to claim 48, wherein said processing means detects a focal detection and a movement position of the object on an image signal the basis of said focus detecting area.

51. An apparatus according to claim 48, wherein said magnification condition is a focal distance of a phototaking lens and information corresponding to a depth of field.

52. A device according to claim 48, wherein said control means is arranged to increase a size of said processing area and decrease the moving range and the moving response speed thereof when a depth of field is deep and to decrease the size of said processing area and increase the moving range and the moving response speed thereof when a depth of field is shallow.

53. A device according to claim 48, wherein said computing means is arranged to compute the position of said processing area by averaging in accordance with a predetermined algorithm a plurality of values of said information detected at different points of time.

* * * * *

UNITED STATES PATENT AND TRADEMARK OFFICE
CERTIFICATE OF CORRECTION

PATENT NO. : 5,629,735
DATED : May 13, 1997
INVENTOR(S) : Kaneda et al.

It is certified that error appears in the above-identified patent and that said Letters Patent is hereby corrected as shown below:

Col. 2, line 8, delete "patent application" and insert -- Patent Applications --.

Signed and Sealed this

Eleventh Day of August 1998

Attest:

BRUCE LEHMAN

*Attesting Officer*   *Commissioner of Patents and Trademarks*